United States Patent
Bjornberg et al.

(10) Patent No.: US 6,496,567 B1
(45) Date of Patent: *Dec. 17, 2002

(54) INTERACTIVE VOICE RESPONSE SERVICE NODE WITH ADVANCED RESOURCE MANAGEMENT

(75) Inventors: Greg Bjornberg; Patrick Hamilton, both of Colorado Springs; Daniel Hutton, Elbert, all of CO (US)

(73) Assignee: MCI Communications Corporation, Washington, DC (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,142

(22) Filed: May 7, 1998

(51) Int. Cl.[7] .................... H04M 1/64; H04M 11/00; H04M 3/42; H04M 3/00

(52) U.S. Cl. .................. 379/88.02; 379/88.07; 379/88.13; 379/142.07; 379/201.01; 379/209.01; 379/210.01; 379/265.05; 379/265.09; 379/265.12

(58) Field of Search ................ 379/88.01, 88.13, 379/67.1, 88.17, 88.19, 91.01, 93.21, 100.12, 100.15, 115, 133, 144, 158, 196, 219, 220, 265, 27, 34; 455/403, 415, 461; 340/825.7, 825.8, 826; 709/234, 236, 237; 707/1–10, 200–206, 67.1, 88.07, 88.08, 88.13, 88.17, 88.22, 93.09, 93.12, 88.02, 142.07, 201.01, 209.01, 210.01, 211.02, 212.01, 265.01, 265.05, 285.1, 265.12, 266.02, 266.07, 902, 908

(56) References Cited

U.S. PATENT DOCUMENTS

| | | | | |
|---|---|---|---|---|
| 4,797,910 A | * | 1/1989 | Daudelin ................ | 379/67 |
| 4,845,739 A | * | 7/1989 | Katz ...................... | 379/92 |
| 4,930,150 A | * | 5/1990 | Katz ...................... | 379/93 |
| 5,048,075 A | * | 9/1991 | Katz ...................... | 379/92 |
| 5,128,984 A | * | 7/1992 | Katz ...................... | 379/92 |
| 5,133,004 A | * | 7/1992 | Heileman, Jr. et al. ... | 379/67.1 |

(List continued on next page.)

OTHER PUBLICATIONS

Emerson, S. Thomas, "Voice Response Systems—Technology to the Rescue for Business Users", Speech Technology, pp. 99–103 (Jan./Feb. 1983).*

Hester, et al., "The AT&T Multi–Mode Voice Systems—Full Spectrum Solutions for Speech Processing Applications", Proceedings of the 1985 AVIOS Conference, pp. 1, 3, 5, 7 and 9 (Sep. 1985).*

Moosemiller, John P., "AT&T's Conversant I Voice System", Speech Technology, pp. 88, 90 and 92 (Mar./Apr. 1986).*

Perdue, Robert J. and Eugene L. Rissanon, "Conversant 1 Voice System Architecture and Applications," AT&T Technical Journal, pp. 34–47 (Sep./Oct. 1986).

Primary Examiner—Allan Hoosain (57) ABSTRACT

An advanced resource management system for an interactive voice response (IVR) service node allows multiple network ports to be served by one application port thereby increasing efficiency. An IVR with a plurality of network ports can now be efficiently configured with a plurality of application ports with varying capabilities. The resource management system determines which of the plurality of application ports on the service node has the capability to service an incoming call and then dynamically assigns a time slot to one of the network ports and to one of application ports to perform IVR services. The dynamic allocation of application ports to network ports also allows for a more simplified connection of the service node to the telecommunications network in which it is deployed.

16 Claims, 5 Drawing Sheets

U.S. PATENT DOCUMENTS

| | | | | |
|---|---|---|---|---|
| 5,165,095 A | * | 11/1992 | Borcherding | 379/88 |
| 5,185,781 A | * | 2/1993 | Dowden et al. | 379/67.1 |
| 5,251,252 A | * | 10/1993 | Katz | 379/92 |
| 5,255,309 A | * | 10/1993 | Katz | 379/88 |
| 5,259,023 A | * | 11/1993 | Katz | 379/88 |
| 5,325,421 A | * | 6/1994 | Hou et al. | 379/67.1 |
| 5,349,633 A | * | 9/1994 | Katz | 379/88 |
| 5,351,285 A | * | 9/1994 | Katz | 379/94 |
| 5,353,339 A | | 10/1994 | Scobee | 379/201.12 |
| 5,519,772 A | | 5/1996 | Akman et al. | 379/221.08 |
| 5,533,115 A | | 7/1996 | Hollenbach et al. | 379/221.11 |
| 5,553,119 A | * | 9/1996 | McAllister et al. | 379/67.1 |
| 5,561,707 A | * | 10/1996 | Katz | 379/88 |
| 5,572,583 A | | 11/1996 | Wheeler, Jr. et al. | 379/221.09 |
| 5,581,600 A | * | 12/1996 | Watts et al. | 379/67.1 |
| 5,583,920 A | * | 12/1996 | Wheeler, Jr. | 379/88.13 |
| 6,038,293 A | | 9/1997 | McNerney et al. | 379/88.19 |
| 5,689,553 A | | 11/1997 | Ahuja et al. | 379/202.01 |
| 5,692,033 A | * | 11/1997 | Farris | 379/67.1 |
| 5,706,286 A | | 1/1998 | Reiman et al. | 370/401 |
| 5,742,905 A | | 4/1998 | Pepe et al. | 455/461 |
| 5,793,771 A | | 8/1998 | Darland et al. | 370/467 |
| 5,802,146 A | | 9/1998 | Dulman | 379/32.03 |
| 5,805,675 A | | 9/1998 | Chanda | 379/93.14 |
| 5,818,921 A | | 10/1998 | Vander Meiden et al. | 379/225 |
| 5,825,752 A | | 10/1998 | Fujimori et al. | 370/260 |
| 5,854,834 A | | 12/1998 | Gottllieb et al. | 379/114.04 |
| 5,867,494 A | | 2/1999 | Krishnaswamy et al. | 370/352 |
| 5,881,131 A | * | 3/1999 | Farris et al. | 379/27 |
| 5,881,135 A | * | 3/1999 | Watts et al. | 379/88.02 |
| 5,883,939 A | | 3/1999 | Friedman et al. | 379/9 |
| 5,915,008 A | | 6/1999 | Dulman | 379/221.08 |
| 5,917,900 A | | 6/1999 | Allison et al. | 379/229 |
| 5,920,562 A | | 7/1999 | Christie et al. | 370/395.5 |
| 5,923,659 A | | 7/1999 | Curry et al. | 370/395.5 |
| 5,923,859 A | | 7/1999 | Melo et al. | 710/113 |
| 5,926,524 A | * | 7/1999 | Taylor | 379/88.08 |
| 5,930,348 A | | 7/1999 | Regnier et al. | 379/221.01 |
| 5,931,914 A | | 8/1999 | Chiu | 709/230 |
| 5,937,029 A | | 8/1999 | Yosef | 379/905 |
| 5,946,386 A | | 8/1999 | Rogers et al. | 379/265.09 |
| 5,953,389 A | * | 9/1999 | Pruett et al. | 379/9 |
| 5,956,396 A | | 9/1999 | Ash et al. | 379/220.01 |
| 5,974,252 A | | 10/1999 | Lin et al. | 717/108 |
| 5,987,118 A | * | 11/1999 | Dickerman et al. | 379/265 |
| 5,987,331 A | | 11/1999 | Grube et al. | 455/509 |
| 5,995,610 A | | 11/1999 | Smidt et al. | 370/307.02 |
| 5,999,525 A | | 12/1999 | Krishnaswamy et al. | 370/352 |
| 6,003,031 A | | 12/1999 | Hartikainen et al. | 707/10 |
| 6,014,428 A | | 1/2000 | Wolf | 379/88.11 |
| 6,018,567 A | | 1/2000 | Dulman | 379/32.03 |
| 6,041,325 A | * | 3/2000 | Shah et al. | 707/10 |
| 6,044,142 A | | 3/2000 | Hammerstrom et al. | 379/223 |
| 6,044,144 A | | 3/2000 | Becker et al. | 379/265.02 |
| 6,044,259 A | | 3/2000 | Hentila et al. | 455/406 |
| 6,081,591 A | | 6/2000 | Skoog | 379/230 |
| 6,104,803 A | | 8/2000 | Weser et al. | 379/230 |
| 6,108,410 A | * | 8/2000 | Reding et al. | 379/265 |
| 6,111,893 A | | 8/2000 | Volftsun et al. | 370/466 |
| 6,122,345 A | | 9/2000 | Johnson | 379/67.1 |
| 6,134,311 A | | 10/2000 | Ekstrom | 379/201.01 |
| 6,137,862 A | | 10/2000 | Atkinson et al. | 379/32.01 |
| 6,144,727 A | | 11/2000 | Mashinsky | 379/114.02 |
| 6,198,813 B1 | | 3/2001 | Pullen et al. | 379/201.01 |
| 6,233,316 B1 | * | 5/2001 | Schier et al. | 379/88.03 |

* cited by examiner

INTERACTIVE VOICE RESPONSE SERVICE NODE WITH ADVANCED RESOURCE MANAGEMENT

CROSS-REFERENCE TO RELATED APPLICATIONS

This application is related to commonly-owned, co-pending applications filed concurrently herewith, entitled:

"Advanced Interactive Voice Response Service Node" having application Ser. No. 09/073,880, filed May 7, 1998;

"Telecommunications Architecture for Call Center Services Using Advanced Interactive Voice, Response Service Nodes" having application Ser. No. 09/074,096, filed May 7, 1998;

"Communications Signaling Gateway and System for an Advanced Service Node" having application Ser. No. 09/074,072, filed May 7, 1998;

"Service Provisioning System for Interactive Voice Response Services" having application Ser. No. 09/074,050, filed May 7, 1998;

"Call and Circuit State Machine for a Transaction Control Layer of a Communications Signaling Gateway" having application Ser. No. 09/073,885, filed May 7, 1998;

"System for Executing Advanced Interactive Voice Response Services Using Service-Independent Building Blocks" having applcation Ser. No. 09/073,087, filed May 7, 1998.

The above applications are incorporated herein by reference in their entirety.

BACKGROUND OF THE INVENTION

1. Field of the Invention

The present invention relates generally to computer telephony, and more particularly to providing an efficient platform for advanced interactive voice

2. Related Art

Interactive Voice Response (IVR) platforms, also commonly known as Voice Response Units (VRUs) or Audio Response Units (ARUs), are common in the telecommunications industry. It is common for a business, who is a customer of an IVR service provider, to use IVR services in conjunction with call center services. Interactive voice response service nodes are commonly used for customer call center routing. They perform processing of customer applications, based on one or more criteria selected by the customer, such as the dialed number of a call, Dialed Number Identification Service (DNIS), Automatic Number Identification (ANI), time of day, caller-entered digits, geographic point of call origin, etc. The IVR service nodes may also perform other IVR services such as automated servicing of callers for customers, caller surveys, telemarketing, and call parking until a call center has an available resource (e.g., a customer service agent).

While there are many types of IVR service nodes each with variations in architecture and features, they typically include a network audio server that is connected, via voice trunks, to a bridging switch on a switch network. The network audio server typically contains many network ports to receive calls and application ports to process the calls. However, all currently available IVR service nodes have several limitations.

One limitation of conventional IVR service nodes, in particular, is that they have limited application processing capability. Customers increasingly demand more advanced IVR applications that require specialized application ports. The IVR service nodes include many different types of application ports to handle different customer's IVR applications. For example, an application port can be a voice port that is capable only of playing recorded messages and accepting Dual Tone Multi Frequency (DTMF) input; a speaker-independent voice recognition (SIVR) port; or a speaker-dependent voice recognition (SDVR) port. The latter two ports have more capabilities and thus are generally more expensive. Consequently, an IVR service provider will limit their number on a IVR service node. Furthermore, conventional IVR service nodes have their application ports hardwired to network ports. Thus a call that requires SIVR or SDVR could only be accepted on certain network ports hardwired to SIVR or SDVR application ports, respectively. If those ports are busy, but a voice port is available, the call has to be blocked or held up until an SIVR or SDVR application port becomes available.

The above described limitations result in network inefficiencies. Therefore, what is needed is an advanced resource management system for interactive voice response service nodes. The advanced resource management system should allow, through dynamic allocation, any application port to be applied to any network port to service a call to the IVR service node.

SUMMARY OF THE INVENTION

The present invention is directed to a system and method for an interactive voice response service node with advanced resource management. The method includes interfacing the resource management system with a plurality of network and application ports located on the service node. When a call comes into the service node, via the network ports, the advanced management resource system determines which of the plurality of application ports has the capability to service the call. Each of the plurality of application ports may include different capabilities (e.g., SIVR functionality) to service different types of calls. The system then dynamically assigns one of the plurality of time slots to one of the plurality of network ports and to one of the plurality of application ports. Allocating the same time slot to an application port and to a network port connects the call for IVR handling.

An advantage of the present invention is that, unlike traditional service nodes, the application ports are not hardwired to the network ports. This allows a more efficient handling of calls by a service node. For example, a call requiring only voice application port capabilities may come into any network port on the service node and be handled by any available application port. This also allows calls needing special application port capabilities to be received by any network port without being blocked from the service node.

Yet another advantage of the present invention is that network flexibility is improved. Because any network port may be dynamically assigned to any application port within an, any network port may now receive a call needing an advanced capability (e.g., SIVR) application port. Therefore a single trunk group may route calls to the service node from the telecommunications network in which it is deployed. Further features and advantages of the present invention as well as the structure and operation of various embodiments of the invention are described in detail below with reference to the accompanying drawings.

BRIEF DESCRIPTION OF THE FIGURES

The present invention will be described with reference to the accompanying drawings, wherein.

DETAILED DESCRIPTION OF THE PREFERRED EMBODIMENTS

Overview

The present invention is directed to a resource management system for an advanced interactive voice response (IVR) service platform. As the next generation of service nodes for providing IVR services is being implemented, the resource management system of the present invention will preferably maximize the efficiency of these nodes. In a preferred embodiment of the present invention, a customer of an IVR service provider may have multiple call centers distributed geographically, all of which are accessed by a single toll-free number. A call to the toll free number is routed by a switch network to an advanced IVR service node, one such node referred to as a next generation service node (NGSN).

The NGSN will then perform customer IVR applications, which may prompt the caller for certain information and collect other information (e.g., dialed number, caller ANI, etc.) from the network. The NGSN will first determine what type of application port is necessary to handle a specific call and then connect the call from the network port to a particular application port. Furthermore, the NGSN may eventually transfer the call to another destination (e.g., a call center). The objective is to handle customer's calls and perform IVR services through efficient management of NGSN resources in routing calls to and from the network and application ports.

The present invention is described in terms of the above example environment. This is for convenience only and is not intended to limit the application of the present invention. In fact, after reading the following description, it will be apparent to one skilled in the relevant art how to implement the following invention in alternate embodiments.

Systems Architecture

Figure 1:
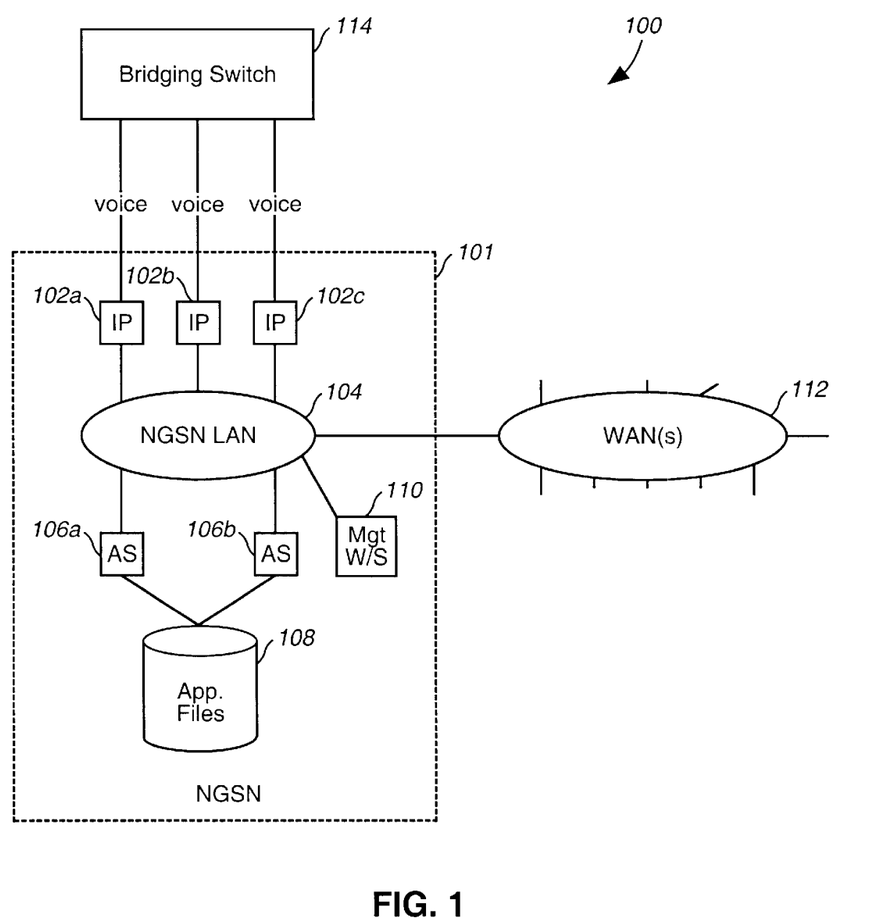
FIG. 1 is a block diagram illustrating the systems architecture of an advanced IVR service node for use in the present invention.

FIG. 1 is a block diagram illustrating the physical architecture 100 of an advanced IVR service node for use in the present invention. Systems architecture 100 uses a next generation service node (NGSN) 101 to perform IVR services. The NGSN 101 is a computing and telephony platform that operates as an IVR service node in a telecommunications network. It includes a pair of redundant application servers 106 (shown as "AS" 106a and 106b), a shared disk array 108, and a plurality of intelligent peripherals 102 (shown as "IP" 102a–102c).

The intelligent peripherals 102 are computers with telephony ports that connect to the network bridging switch 114 via T1 voice trunks. The general purpose of intelligent peripherals 102 is to receive calls from the network, provide voice responses to the caller, and collect caller input via DTMF signals or voice recognition. The functions of the intelligent peripherals 102 are controlled by applications on the pair of redundant application servers 106. In a preferred embodiment, the intelligent peripherals 102 are built using DEC Alpha Voice 1000 computers and the application servers are built using DEC Alpha 8400 computers.

The intelligent peripherals 102 and application servers 106 are connected to a NGSN local area network (LAN) 104, which in a preferred embodiment is comprised of a gigabit Ethernet switch or a FDDI switch. The NGSN LAN 104 is connected to a wide area network (WAN) 112, which in a preferred embodiment is an Ethernet WAN. The WAN 112 allows multiple NGSN 101 platforms to be connected via a single network.

Also connected to the NGSN LAN 104 is a node monitoring and alarming (a.k.a, management) workstation ("Mgt W/S") 110. Management workstation 110 collects and stores alarms generated by the application servers 106 and the intelligent peripherals 102, and provides a user interface to these alarms. It also forwards alarms over the WAN 112. The management workstation 110 serves as a central collection point of all alarms generated on the NGSN 101, and forwards them to a central collection point of all alarms generated by the plurality of possible NGSN 101 platforms located on a network connected via WAN 112.

An NGSN 101 platform architecture and functionality are described in further detail in a commonly-owned, co-pending application filed concurrently herewith, entitled "Advanced Interactive Voice Response Service Node" having application Ser. No. 09/074,096. Furthermore, an architecture for a telecommunications network using NGSN 101 is described in detail in a commonly-owned, co-pending application filed concurrently herewith, entitled "Telecommunications Network Architecture for Call Center Services using Advanced Interactive Voice Response Service Nodes" having application Ser. No. 09/074,096. Both commonly-owned, co-pending applications are incorporated herein by reference in their entirety.

Figure 2:
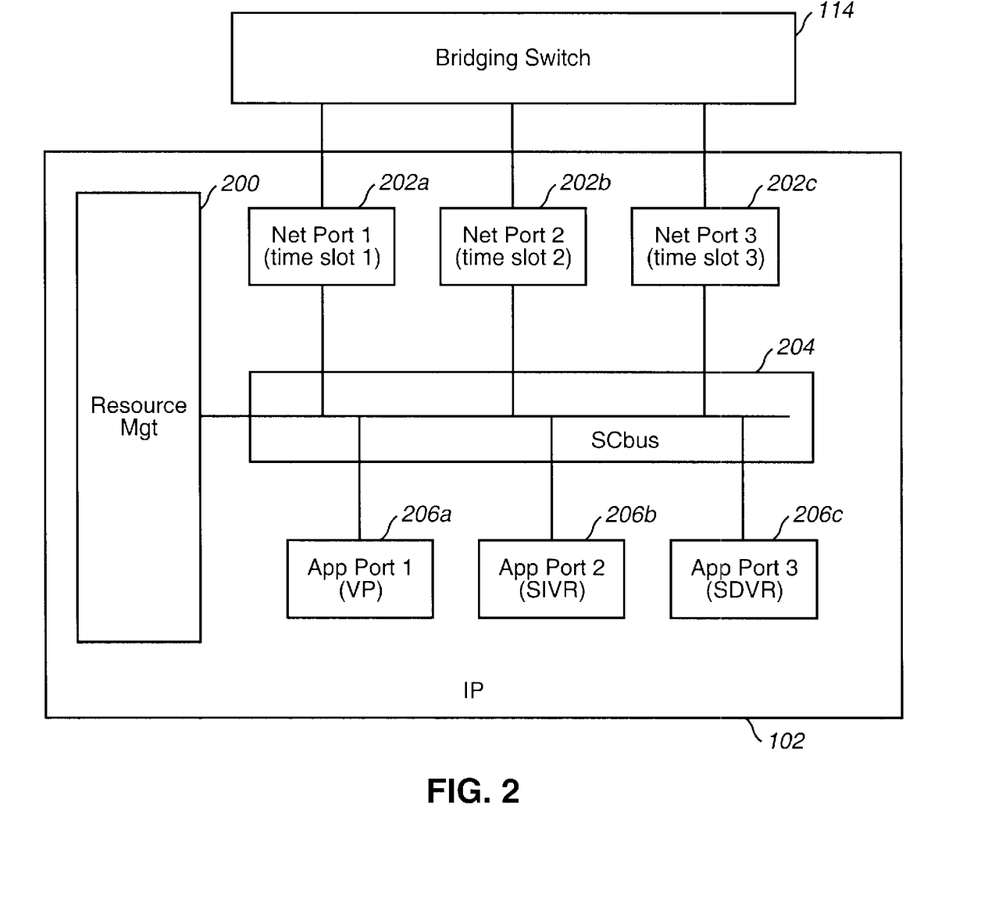
FIG. 2 is a block diagram illustrating a logical architecture of the present invention according to a preferred embodiment.

FIG. 2 is a block diagram illustrating the logical architecture of the resource management system located on each intelligent peripheral 102 according to a preferred embodiment. Intelligent peripheral 102 is connected to bridging switch 114 via a plurality of network ports 202. Bridging switch 114 provides NGSN 101 with access to a Public Switch Telephone Network (PSTN) (referred to as a "switch network") (not shown). While three network ports 202a–202c and logical voice connections to the bridging switch 114 are shown in FIG. 2 for illustrative purposes, in reality there may be several hundred network ports 202 and connections on the intelligent peripheral 102. Each network port 202 is typically, but not necessarily, a DS-0 port that has been demultiplexed from a DS-3 port. The DS-3 ports supports a DS-3 trunk to the bridging switch 114. It will be understood by one skilled in the relevant art that the present invention may also be applied to synchronous optical network (SONET) ports demultiplexed from OC-3 ports and converted to electrical signal ports.

Intelligent peripheral 102 also includes a plurality of application ports 206. While three application ports 206a–206c are shown in FIG. 2 for illustrative purposes, in reality there may be several more. However, in accordance with the present invention, and as a novel and advantageous result of the invention's resource management technique, there may be far less application ports 206 than network ports 202. For example, in a preferred embodiment, the intelligent peripheral 102 may have 16 DS-1 connections to the bridging switch 114, supporting 384 DS-0 network ports 202, and 48 application ports 206, for a network-to-application port ratio of 8:1.

Application port 206 is a process thread that is used to execute an IVR service application. Execution of an IVR service application is applied to a network port 202, and may include such processes as playing recorded menus for the caller, accepting caller input via DTMF signals, and accepting caller input via voice recognition. There may be different types of application ports 206, with different capabilities. For example, application port 206a is a voice port (VP) that is capable only of playing recorded messages and accepting DTMF input; application port 206b is capable of speaker-independent voice recognition (SIVR); and application port 206c is capable of speaker-dependent voice recognition (SDVR).

Resource Management Implementation

Because application ports 206 with increased capability, such as SDVR, require greater processing, they are more expensive. An IVR service provider will most likely desire to balance the number of application ports 206 with and without greater capability on intelligent peripheral 102 with the requirements of incoming calls. This balancing will preferably optimize an intelligent peripheral 102 platform. The present invention increases an IVR service provider's ability to do this by allowing any application port 206 to be applied to any network port 202. Thus, a call that requires only a voice port may be accepted by the intelligent peripheral 102 on any network port 202, as can a call that requires SIVR. This is one way the present invention increases the resource efficiency of an intelligent peripheral 102. In accordance with conventional systems, which hardwires each of the application ports 206 to a corresponding network port 202, a call that required SIVR could only be accepted on certain network ports 202. If those ports were busy, but a voice port was available, the call still had to be blocked or held up until an SIVR network port became available.

The application ports 206 and network ports 202 are connected by a time division multiplexing (TDM) switching bus architecture 204. In a preferred embodiment, this is provided by Dialogic Corporation's (Parsippany, N.J.) Dialogic® SCbus which is well known in the relevant art. The SCbus 204 is a software/hardware product that is defined as part of Dialogic's Signal Computing System Architecture (SCSA). It enables the switching of process communications between application ports 206 and network ports 202.

In a preferred embodiment, each network port 202 is assigned a time slot in the SCbus 204. Application ports 206 are also assigned time slots. A time slot is used to communicate between one of the network ports 202 and one of the application ports 206. Each port has the capability to listen to any time slot, so that any of the network ports 202 or the application ports 206 may pass data to any other port 202 or port 206. This is possible when two ports are assigned to the same time slot.

Time slot assignments are managed by a resource management 200 process. Resource management 200 assigns the network ports 202 and the application ports 206 to time slots on a dynamic basis. Any of the network ports 202 or the application ports 206 may be assigned to any time slot. Thus, one of the application ports 206 may be dynamically assigned to one of the network ports 202, via common time slot assignment, for the duration of time that the network port 202 requires the use of the application port 206.

Figure 3:
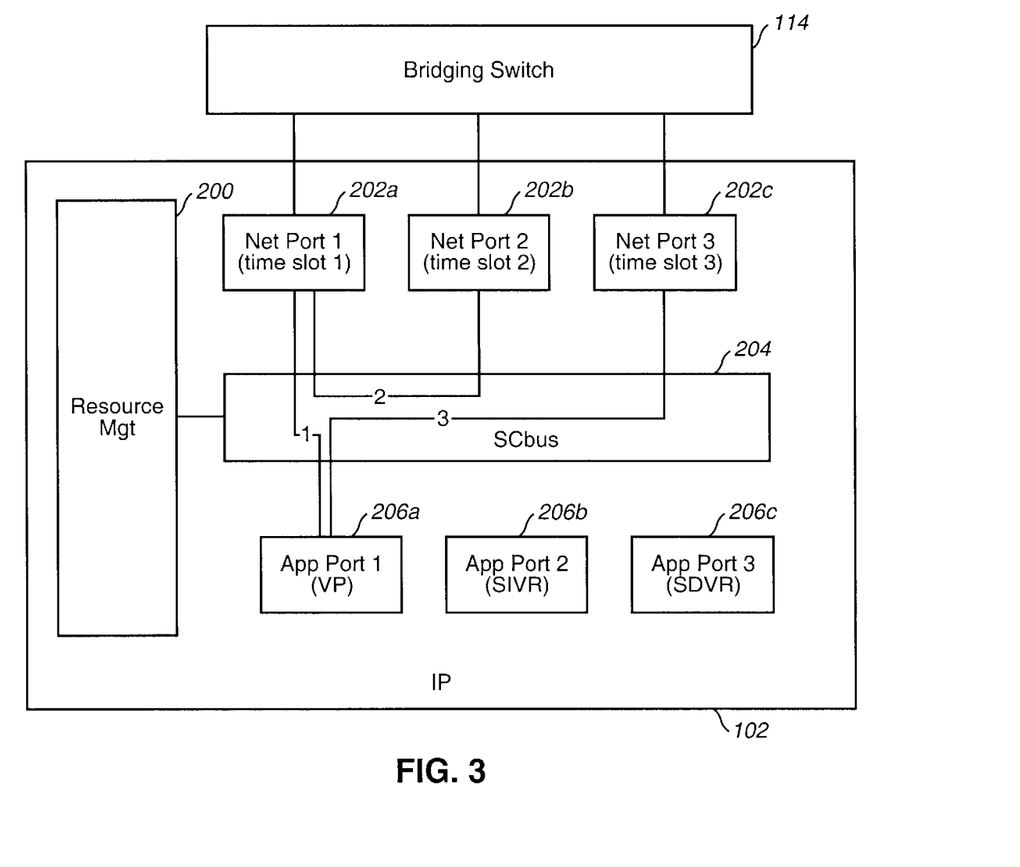
FIG. 3 illustrates a typical network-to-application port assignment process in accordance with a preferred embodiment of the present invention.
Figure 4:
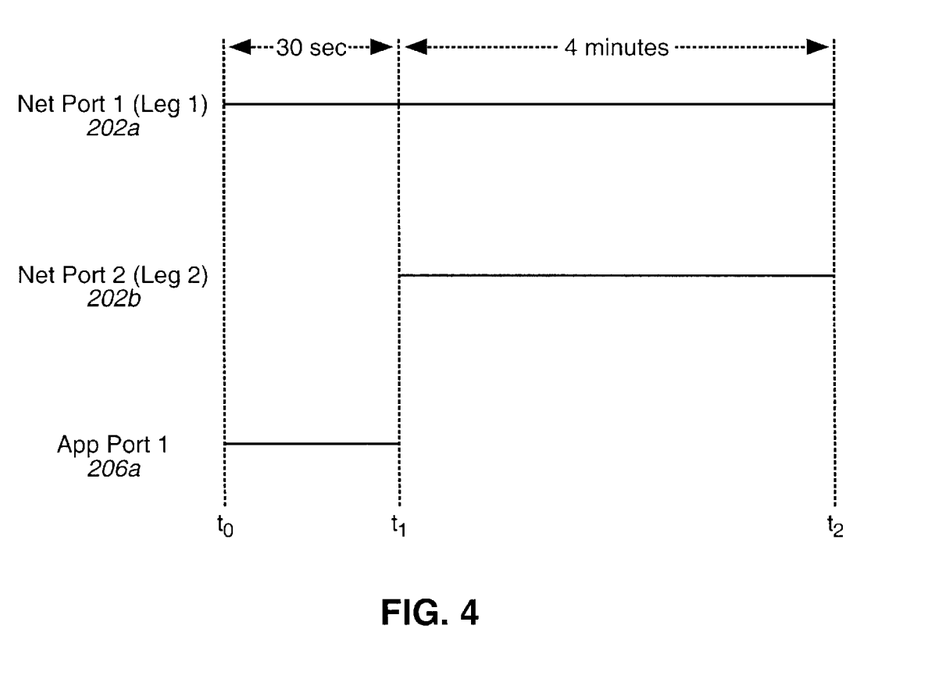
FIG. 4 is a timing diagram that shows the use of a network port and an application port to service a call in accordance with a preferred embodiment of the present invention.

FIG. 3 illustrates a typical network-to-application port assignment process used by resource management 200. FIG. 4 is a timing diagram that shows the use of network ports 202 and application ports 206 for a call given the port assignment in FIG. 3. At time $t_0$, an inbound call is received by the intelligent peripheral 102 on the network port 202a. This call is for a simple IVR service that requires a voice port (VP application port 206a). Resource management 200 links network port 202a with application port 206a, via common time slot assignment. This is represented as step 1 in FIG. 3. The inbound call on network port 202a represents a first leg ("Leg 1") of a call. This is the leg that extends the call from a call originator, through the telecommunications network, to the NGSN 101 node.

An IVR service application is performed for the call, via the application port 206a. During this processing, the service application determines that the call needs to be transferred to another destination. At time $t_0$, the intelligent peripheral 102 originates a call to the destination via the bridging switch 114. The network port 202b is used to place the outbound call. Resource management 200 links the network port 202a with the network port 202b to complete the call. This is represented as step 2 in FIG. 3. The outbound call represents Leg 2 of the call. At time $t_0$, the application port 206a is no longer needed, and drops off the call (resource management 200 deassigns application port 206a from the time slot). The extended call continues until time $t_2$. During this time, application port 206a is free to service another network port 202. In step 3 in FIG. 3, resource management 200 links the application port 206a to the network port 202c to service another call.

In a typical call, one of the application ports 206 is needed only for about the first 30 seconds, as represented in FIG. 4 by the $t_0$–$t_1$ time span. The extended call lasts for an average of about 4 minutes ($t_1$–$t_2$). With average call times in this range, an network-to-application port ratio of about 8:1 may be maintained.

Typically, one of the network ports 202 will require one of the application ports 206 for the initial part of a call. It is desirable to ensure that one of the application ports 206 will be available to one of the network ports 202 when a call is first received. If the intelligent peripheral 102 includes 384 network ports 202 and 48 application ports 206 (8:1 ratio), there is a need to avoid receiving more than 48 inbound calls at once, thereby overloading the capacity of all the application ports 206. To do this, NGSN 101 controls inbound calls at the bridging switch 114. The NGSN 101 will tell the bridging switch 114 when it can accept an inbound call. The NGSN 101 will not allow the bridging switch 114 to send an inbound call until at least one of the application ports 206 is available. An interface and signaling between the bridging switch 114 and NGSN to accomplish this are described in further detail in a commonly-owned, application filed concurrently herewith, entitled "Communications Signaling Gateway and System for an Advanced Service Node" having application Ser. No. 09/074,072, which is incorporated herein by reference in its entirety.

Environment

Figure 5:
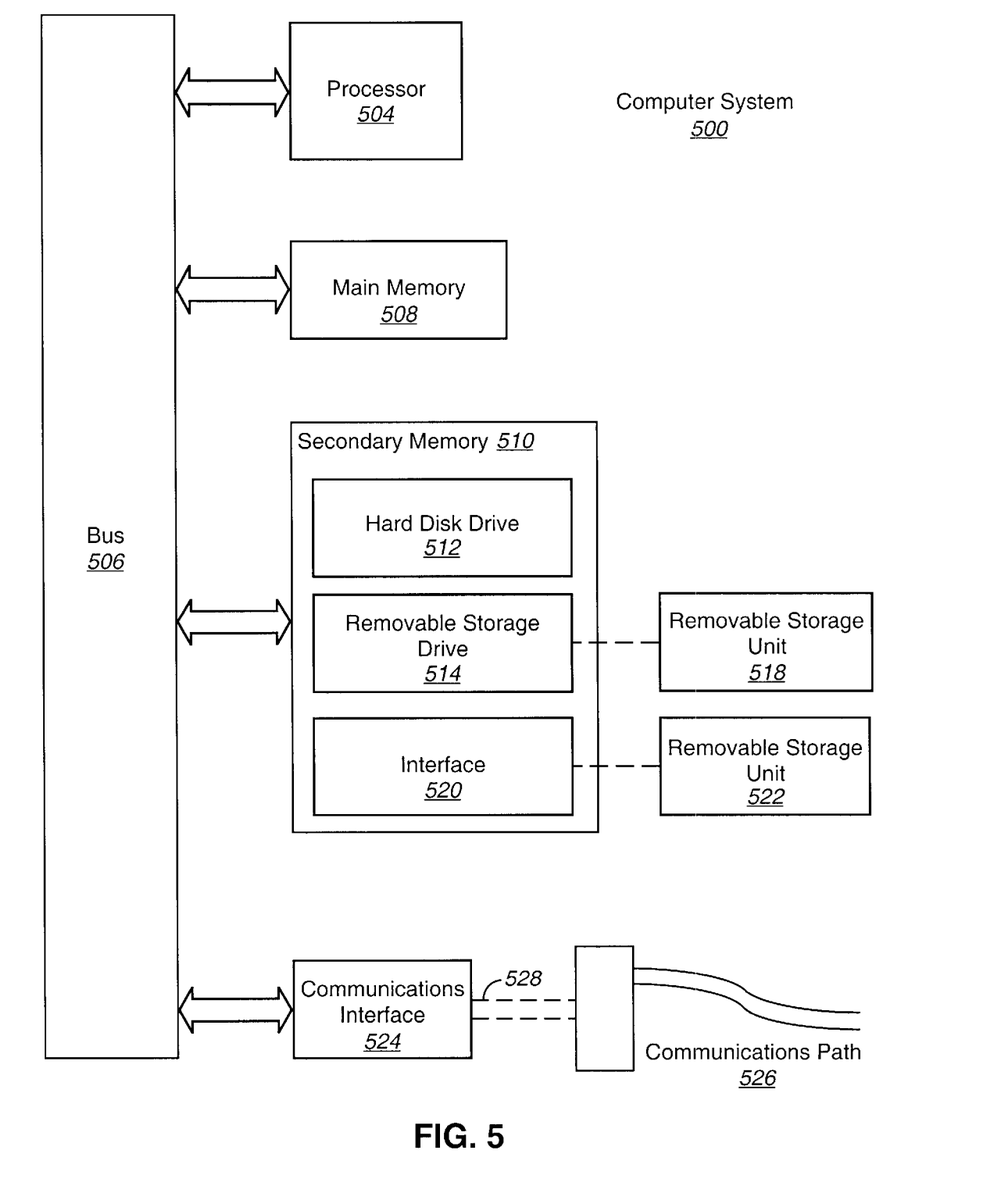
FIG. 5 is a block diagram of an exemplary computer system useful for implementing the present invention.

The present invention (i.e., the resource management 200 process or any part thereof) may be implemented using hardware, software or a combination thereof and may be implemented in a computer system or other processing system. In fact, in one embodiment, the invention is directed toward a computer system capable of carrying out the functionality described herein. An example of a computer system 500 is shown in FIG. 5. The computer system 500 includes one or more processors, such as processor 504. The processor 504 is connected to a communication bus 506. Various software embodiments are described in terms of this exemplary computer system. After reading this description, it will become apparent to a person skilled in the relevant art how to implement the invention using other computer systems and/or computer architectures.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, etc. The removable storage drive 514 reads from and/or writes to a removable storage unit 518 in a well known manner. Removable storage unit 518, represents a floppy disk, magnetic tape, optical disk, etc. which is read by and written to by removable storage drive 514. As will be appreciated, the removable storage unit 518 includes a computer usable storage medium having stored therein computer software and/or data.

In alternative embodiments, secondary memory 510 may include other similar means for allowing computer programs or other instructions to be loaded into computer system 500. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 may also include a communications interface 524. Communications interface 524 allows software and data to be transferred between computer system 500 and external devices. Examples of communications interface 524 may include a modem, a network interface (such as an Ethernet card), a communications port, a PCM-CIA slot and card, etc. Software and data transferred via communications interface 524 are in the form of signals 528 which may be electronic, electromagnetic, optical or other signals capable of being received by communications interface 524. These signals 528 are provided to communications interface 524 via a communications path (i.e., channel) 526. This channel 526 carries signals 528 and may be implemented using wire or cable, fiber optics, a phone line, a cellular phone link, an RF link and other communications channels.

In this document, the terms "computer program medium" and "computer usable medium" are used to generally refer to media such as removable storage drive 514, a hard disk installed in hard disk drive 512, and signals 528. These computer program products are means for providing software to computer system 500.

Computer programs (also called computer control logic) are stored in main memory 508 and/or secondary memory 510. Computer programs may also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512 or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. An advanced resource management system for an interactive voice response service node having a plurality of network ports, a plurality of application ports, and a bus interposed therebetween, wherein the interactive voice response service node includes a plurality of time slots, comprising:

means for selecting a particular one of the plurality of applications ports having the capability to service a call on a particular one of the plurality of network ports;

first assigning means for dynamically assigning a particular one of the plurality of time slots to said particular one of the plurality of network ports;

second assigning means for dynamically assigning said particular one of the plurality of time slots to said particular one of the plurality of application ports;

network port linking means for dynamically linking said particular one of the plurality of network ports to any other of the plurality of network ports through said bus in response to a call servicing determination on said particular one of the plurality of applications ports; and wherein said call on one of the plurality of network ports can be serviced by any of the plurality of application ports by using said first and said second assigning means to assigning each, respectively, to the same one of the plurality of time slots, and using said bus, linking to any other of the plurality of network ports following servicing, thereby freeing said particular one of the plurality of application ports.

2. The system of claim 1, further comprising:

first deassigning means for deassigning said particular one of the plurality of time slots from said particular one of the plurality of network ports; and second deassigning means for deassigning said particular one of the plurality of time slots from said particular one of the plurality of application ports.

3. The system of claim 1, further comprising:

means for blocking said call on one of the plurality of network ports if none of the plurality of application ports with the required capability to service said call is available.

4. The system of claim 1, wherein said first assigning means and said second assigning means allow the servicing of outbound and inbound calls from the service node.

5. The system of claim 1, wherein the ratio of the plurality of network ports to the plurality of application ports is 8:1.

6. The method recited in claim 1 above, further comprising:
   deassigning said particular one of the plurality of time slots from said particular one of the plurality of network ports; and
   assigning said particular one of the plurality of time slots to another of the plurality of network ports.

7. The method recited in claim 1 above, further comprising:
   deassigning said particular one of the plurality of time slots from said particular one of the plurality of network ports; and
   deassigning said particular one of the plurality of time slots from said particular one of the plurality of application ports.

8. A method for providing advanced resource management on an interactive voice response service node having a plurality of network ports, a plurality of application ports, and a bus interposed therebetween, wherein the interactive voice response service node includes a plurality of time slots, comprising the steps of:
   selecting a particular one of the plurality of application ports having the capability to service a call on a particular one of the plurality of network ports;
   dynamically assigning a particular one of the plurality of time slots to said particular one of the plurality of network ports;
   dynamically assigning said particular one of the plurality of time slots to said particular one of the plurality of application ports; and
   dynamically linking said particular one of the plurality of network ports to any other of the plurality of network ports through said bus in response to a call servicing determination on said particular one of the plurality of applications ports, thereby freeing said particular one of the plurality of application ports.

9. The method of claim 8, further comprising the steps of:
   (4) deassigning said particular one of the plurality of time slots from said particular one of the plurality of network ports; and
   (5) deassigning said particular one of the plurality of time slots from said particular one of the plurality of application ports.

10. The method of claims 8, further comprising the step of:
    (4) blocking said call on said particular one of the plurality of network ports if none of the plurality of application ports with the required capability to service said call is available.

11. A computer program product comprising a computer usable medium having computer readable program code means embodied in said computer usable medium for causing an application program to execute on a computer that provides an advanced resource management system for an interactive voice response service node having a plurality of network ports, a plurality of application ports, and a bus interposed therebetween, wherein the interactive voice response service node includes a plurality of time slots, said computer readable program code means comprising:
    a first computer readable program code means for causing the computer to select a particular one of the plurality of application ports having the capability to service a call on a particular one of the plurality of network ports;
    a second computer readable program code means for causing the computer to dynamically assign a particular one of the plurality of time slots to said particular one of the plurality of network ports;
    a third computer readable program code means for causing the computer to dynamically assign said particular one of the plurality of time slots to said particular one of the plurality of application ports;
    a fourth computer readable program code means for causing the computer to dynamically link said particular one of the plurality of network ports to any other of the plurality of network ports through said bus in response to a call servicing determination on said particular one of the plurality of applications ports; and
    wherein said call on one of the plurality of network ports can be serviced by any of the plurality of application ports by using said first and said second assigning means to assign each, respectively, to the same one of the plurality of time slots, and using said bus, linking to any other of the plurality of network ports following servicing, thereby freeing said particular one of the plurality of application ports.

12. The computer program product of claim 11, further comprising:
    a fourth computer readable program code means for deassigning said particular one of the plurality of time slots from said particular one of the plurality of network ports; and
    a fifth computer readable program code means for deassigning said particular one of the plurality of time slots from said particular one of the plurality of application ports.

13. An intelligent peripheral (IP) comprising:
    a plurality of network ports connected to a plurality of networks;
    a plurality of application ports connected to at least two interactive voice response (IVR) service applications, wherein each of said plurality of application ports have the capability of servicing a call with at least one of said at least two interactive voice response (IVR) services;
    time slot identification means for identifying a particular one of a plurality of time slots;
    first time slot assignment means for dynamically assigning said identified particular one of the plurality of time slots to a particular one of the plurality of network ports;
    second time slot assigning means for dynamically assigning said identified particular one of the plurality of time slots to a particular one of the plurality of application ports;
    a bus means for dynamically linking said particular one of the plurality of network ports to any other of the plurality or network ports in response to a call servicing determination on said particular one of the plurality of applications ports; and
    wherein the call on one of the plurality of network ports can be serviced by any of the plurality of application ports by using said first and said second assigning means to assign each, respectively, to the same one of the plurality of time slots, and using said bus means, linking to any other of the plurality of network ports following servicing, thereby freeing said particular one of the plurality of application ports.

14. The intelligent peripheral (IP) recited in claim 13 above, further comprising:

means for deassigning said particular one of the plurality of time slots from said particular one of the plurality of network ports; and  means for assigning said particular one of the plurality of time slots to another of the plurality of network ports.

15. The method recited in claim 14 above, further comprising:

deassigning said particular one of the plurality of time slots from said particular one of the plurality of network ports; and  assigning said particular one of the plurality of time slots to another of the plurality of network ports.

16. The method recited in claim 14 above, further comprising:

deassigning said particular one of the plurality of time slots from said particular one of the plurality of network ports; and deassigning said particular one of the plurality of time slots from said particular one of the plurality of application ports.

\* \* \* \* \*